United States Patent [19]

Millman et al.

[11] 4,062,994

[45] Dec. 13, 1977

[54] ENERGY ABSORBING COMPOSITE STRUCTURES

[75] Inventors: Robert Savile Millman, Nottingham; John Godfrey Morley, Little Eaton, both of England

[73] Assignee: National Research Development Corporation, London, England

[21] Appl. No.: 551,299

[22] Filed: Feb. 19, 1975

Related U.S. Application Data

[63] Continuation-in-part of Ser. No. 274,014, July 21, 1972, abandoned.

[30] Foreign Application Priority Data

| July 27, 1971 | United Kingdom | 35107/71 |
| Dec. 23, 1971 | United Kingdom | 60110/71 |
| Mar. 16, 1972 | United Kingdom | 12199/72 |
| Apr. 15, 1972 | United Kingdom | 17505/72 |

[51] Int. Cl.² .................. B32B 7/06; B60R 19/02; F16D 63/00; G01N 3/08
[52] U.S. Cl. .................. 428/101; 428/221; 293/71 R; 138/106; 188/1 R; 73/95
[58] Field of Search ............ 428/221, 101, 223; 188/1 C; 138/106; 293/1, 71, 70, 69, 88, 84; 73/95

[56] References Cited

U.S. PATENT DOCUMENTS

| 3,168,114 | 2/1965 | Martin | 138/106 |
| 3,373,630 | 3/1968 | Heurtebise | 188/1 C |
| 3,432,200 | 3/1969 | Barton | 293/71 |
| 3,437,367 | 4/1969 | Blank | 293/70 |
| 3,604,285 | 9/1971 | Olsson | 188/1 C |
| 3,663,048 | 5/1972 | Zimmerle | 188/1 C |
| 3,721,433 | 3/1973 | Sobel | 188/1 C |

Primary Examiner—Philip Dier
Attorney, Agent, or Firm—Cushman, Darby & Cushman

[57] ABSTRACT

Energy-absorption for a composite article is achieved by incorporation in the article of a load-bearing tubular element of ductile material which is bonded to another component of the article, the ductility of the element being such that the element deforms plastically at a part intermediate its ends when subjected to axial tensile stress less than the ultimate tensile strength of the element, the ductile material having deformation characteristics which cause the wall of the said part of the element to contract towards its longitudinal axis, thereby absorbing energy. An inner member may be provided to resist inwards continuation of the tubular element and the tubular element may be situated inside an outer sheath member. The said inner member and/or outer sheath member may be formed to elongate or break before the tubular element in response to the axial tensile stress.

15 Claims, 8 Drawing Figures

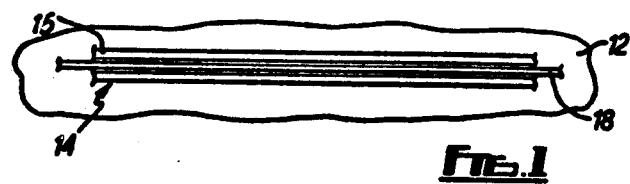
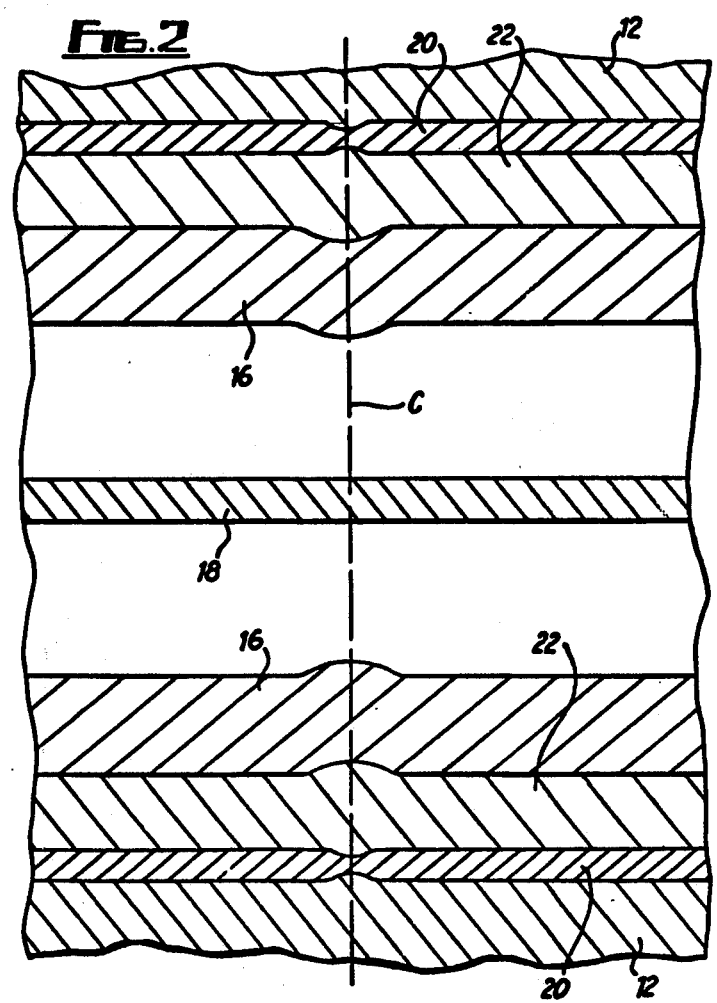

ENERGY ABSORBING COMPOSITE STRUCTURES

The invention relates to energy-absorbing composite structures. This application is a continuation-in-part of application Ser. No. 274,014, filed July 21, 1972 and now abandoned.

Composite articles or materials have been proposed in which the interfacial contact between an inner member and the element or material around it is such that the local shear strength of the interfacial bond is reduced as the local tensile stress in the article or material increases. This is achieved by inducing controlled debonding of the interface under tensile load, the arrangement preferably being such that the local shear strength of the interfacial bond is reduced to zero at a local tensile stress in the article just less than the ultimate tensile strength of the inner member.

The present invention is concerned with composite structures having similar failure characteristics which may be used as or in reinforced composite materials but which are also capable of a wider field of use.

The invention provides a composite article incorporating at least one plastically deformable tubular load-bearing element arranged to contract inwardly at a stress level less than its ultimate tensile strength when subjected to a tensile load.

An inner member may be located within the tubular element, the inner member being capable of withstanding the contracting load resulting from the plastic deformation of the tubular element when subjected to a tensile load. The inner member may be connected at both ends to the surrounding tubular element, the inner member being arranged to extend in tension, either by rupture at one or more places or by plastic or elastic elongation, before the tubular element. This may be achieved by locally weakening the inner member, for example by introducing surface notches or by choosing a material for the inner member with a lower strain to failure than the outer member. Where the inner and outer members are connected at one end only or are unconnected, this is not necessary.

In a further arrangement the inner member and the surrounding tubular element may be connected together at one end, the tubular element being anchored at its other end such that a tensile load may be applied to the tubular outer element through the inner member and will cause the outer element to contract progressively towards or on to the inner member.

Alternatively the wall thickness of the tubular element may be such that contraction without fracture of the tubular element can take place without the provision of internal support.

As applied to a composite material the tubular element may itself be located within an outer sheath, the sheath being relatively weakly bonded to the tubular element and being arranged to fail in tension before the tubular element.

Premature local failure of the outer sheath may be induced by introduction of deliberate flaws, by use of relatively small wall thickness compared with the primary load-bearing tubular element within it, by control of the metallurgical characteristics of the sheath and element, or in any other convenient manner.

In a modification the outer sheath may be radially spaced from the tubular element and bonded thereto at its opposite ends only. By arranging for the outer sheath to fracture at a tensile stress below that at which inward contraction of the tubular element commences, the sheath fractures first under tensile load, and the tubular element then collapses progressively while absorbing energy in the process. In this way the desired failure characteristics may be achieved without involving debonding of the interface between the primary load-bearing tubular element and the rest of the composite structure.

In a further refinement the outer sheath and tubular element may be interconnected, for example by means of longitudinally directed webs or by use of filamentary material such as steel wire woven between them.

According to yet a further aspect of the invention, a method of energy absorption in an article comprises the use of at least one tubular element in mechanical contact with the article, said element being of ductile material having deformation characteristics such that, under a tensile stress which is lower than the ultimate tensile strength of the said material, part of the wall of the said element contracts towards its longitudinal axis, energy being absorbed as a result of said contraction.

According to another aspect of the invention, a method of energy absorption for an article, comprises the use of at least one tubular element in mechanical contact with the article and the provision of an inner member which is positioned at least partly within at least part of said tubular element, said element being formed from ductile material having deformation characteristics such that, under an axial tensile stress which is lower than the ultimate tensile strength of the element, part of the wall of the element contracts towards its longitudinal axis, the dimensions of said element and of said part of said inner member being arranged to be such that in contracting said part of said element engages the said part of said inner member, the inner member being capable of withstanding the load resulting from such engagement, whereby further contraction of said element is prevented and further parts of said element contract into engagement with other parts of said inner member progressively along its length, thereby performing an energy absorbing function.

Embodiments of the invention will now be described, by way of example only, and partly with reference to the accompanying diagrammatic drawings, in which:

FIG. 1 is a longitudinal section through a portion of one form of composite material embodying the invention;

FIG. 2 is a greatly enlarged section through a modified composite material;

Figure 3:
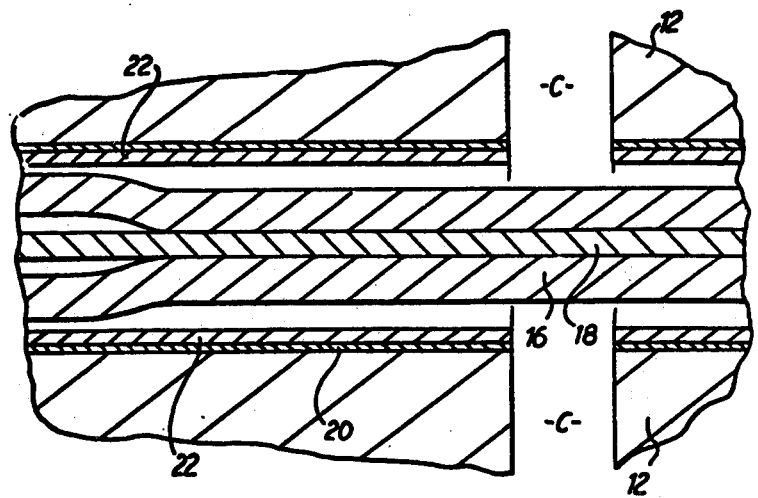
FIG. 3 is a section similar to FIG. 2 showing a further modification.

Referring to FIG. 1, there is shown a resin matrix 12 in which are embedded a plurality of reinforcing elements one of which is shown at 14. Each reinforcing element consists of an outer tubular element 16 and an inner rod or wire 18, both of which may be of high strength steel. The wire 18 is positioned inside the tubular element and the two may be unconnected or may be connected at one or both ends. The main tensile load is carried by the tubular equipment, and if the wire and element are connected at both ends the wire requires to be arranged to fail in tension before the element, for example by locally weakening the wire or by use of a material with a lower strain to failure. This is not necessary where the wire is connected to the tubular element at one end only or where the two are unconnected since the wire is free to move relative to the rest of the material. Generally there will be a connection at least at one end but with certain structures, for example circular structures, the wire and tubular element may be unconnected since the wires cannot fall out of the material due to the nature of the structure.

As an example, tubular element 16 may be made of high strength steel as is the inner rod or core 18. The main tensile stress is carried out by the tubular element 16 which is embedded in rubber or another plastic matrix material 12.

When the material is subjected to tensile loading, the tubular element 16 will deform plastically. This deformation will take the form of "necking down" of the element on to the wire 18, the arrangement being such that contact with the wire prevents the necking down from proceeding to the point at which the element fails in tension. The tubular element thus clamps tightly round the wire and the wire begins to carry a tensile load in this region. Since the element has debonded from the resin matrix 12 during this initial necking down process, stress can only be transferred from the matrix to the tube through the still bonded interface some distance away from the necked down region. The result is that the region of plastic failure of the tube propagate longitudinally in both directions, each portion of the tube being debonded successively from the matrix. This deformation process takes place at a high stress level so that a large amount of energy is absorbed and additionally energy is absorbed in breaking the interfacial bond, which energy would otherwise go to propagate the crack through the matrix.

A stage is eventually reached where the area of contact between the tube and the matrix at the end of any particular reinforcing element becomes insufficient to transfer stress to the deforming tube. At this stage the remaining portion of the interface fails in shear and further deformation of the material takes place by longitudinal displacement of the reinforcing elements with respect to the matrix against residual frictional forces.

Thus two separate deformation processes operate sequentially before failure of the material. Tensile failure of the reinforcing elements is prevented whatever the initial aspect ratio of the reinforcing elements and the strength of the bond to the matrix. The stress level for the first stage of the deformation process can be controlled by the volume fraction of reinforcing elements and by control of the metallurgical characteristics and relative proportions of the tube and the core. The first stage deformation process takes place at a constant stress level, the second at a diminishing stress level as the partly deformed elements are pulled out of the matrix. The rate by which the stress carried by the material diminishes with increasing deformation and the extent of this second stage deformation is dependent on the effective lengths of the reinforcing elements at the onset of the secondary deformation process.

The tubular elements need not be of circular cross-section and the tubular reinforcing elements 14 or cores may be of any suitable filamentary material or bundle of filamentary materials such as carbon, boron or glass fibres. Alternatively the inner member may itself be tubular or may be a tubular element containing a further filamentary material. In this way the inner tubular element supports the outer member and the innermost filament supports the inner tubular element thereby further delaying the fracture of the outer member and total fracture of the composite. The inner tubular element and the outer member could also be attached by a resin or other interlayer if desired, provided this is not sufficiently rigid to prevent operation of the process described above.

In the FIG. 1 composite the interface which debonds is that between the matrix 12 and the tubular element 16 of the reinforcing element. If this mechanism is to operate satisfactorily the matrix must maintain its integrity which may not always be the case in practice, depending on the type of matrix used, and moreover after the interface has debonded the material as a whole has little or no transverse tensile or longitudinal shear strength (unless the volume fraction of reinforcing elements is very low). In order to improve these properties the arrangement illustrated in FIG. 2 may be utilised. In this case the tubular element and core corresponding to those of FIG. 1 are indicated by the same reference numerals and the element consisting of these parts is enclosed in an outer sheath 20 which is strongly bonded to the matrix but relatively weakly bonded by a layer of resin 22 to the element 16 which element now becomes the inner tubular element and remains a primary load-bearing member.

The outer sheath 20 is designed such that it fails in tension before the inner element. In FIG. 2 this is achieved by use of an outer sheath with a relatively thin wall compared with that of the inner tubular element, though the desired result may be achieved in other ways as previously mentioned. In this way a matrix crack C at a local region will cause failure of the outer sheath which in turn will impose increased strain on the tubular element causing same to deform plastically. The element will thus collapse on to the central core and the interface between the tubular element and the sheath will then debond in much the same manner as the matrix/core interface in the FIG. 1 embodiment (see FIG. 3). However progressive uniform debonding is not now dependent on the integrity of the matrix as was the case with the FIG. 1 arrangement. With the FIG. 1 arrangement it is possible that complete loss of large areas of matrix could lead to local necking down of the tubular element at weak points ahead of the propagating plastic region.

When the matrix remains intact and the sheath and matrix remain bonded together, the composite material, even after longitudinal tensile deformation, preserves its transverse tensile and longitudinal shear strength. Should the matrix fragment the ability to debond uniformly and progressively is not destroyed since debonding occurs at a different interface. Additional control of the situation can be obtained by suitable design of the inner and outer interfaces of the sheath and the nature of the polymeric material between the sheath and the tubular element and also that of the matrix. Where both sheath and element are metal, additional control of the relative failure strain of both sheath and element can be obtained by modifying the metallurgical characteristics of the material from which each is formed.

Figure 4:
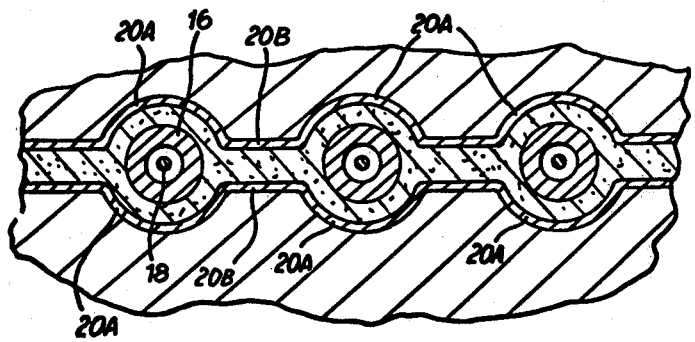
FIG. 4 is a transverse section showing a further modification.

FIG. 4 shows a further modification in which the sheaths instead of being formed individually are replaced by co-operating longitudinal corrugations 20A of opposed sheet-like members, the corrugations being interconnected by webs 20B. This construction provides improved transverse strength but otherwise operates during failure under tensile load in the same manner as the FIGS. 2 and 3 arrangement. A similar effect may be obtained by weaving a suitable filamentary material such as steel wire between adjacent separate sheaths.

Thus the embodiments provide reinforced composite materials having increased works of fracture under longitudinal tensile load compared with currently available materials and which lend themselves to relative ease of fabrication. The deformation process may be independent of the physical metallurgy of the reinforcing elements, being controlled by the geometrical arrangement of the composite structure. In the case of metals designed to give high values of energy absorption therefore, the usual conflict between a high yield stress and a large elongation to failure is avoided and it becomes possible to optimise the reinforcing elements to give higher yield strengths since the elongation of the composite material is provided by a separate mechanism.

Figure 5:
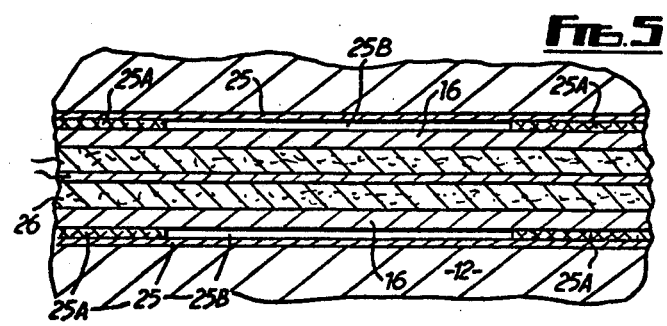
FIG. 5 is a transverse cross-section through a further modified form of reinforcing element in a composite material before failure.
Figure 6:
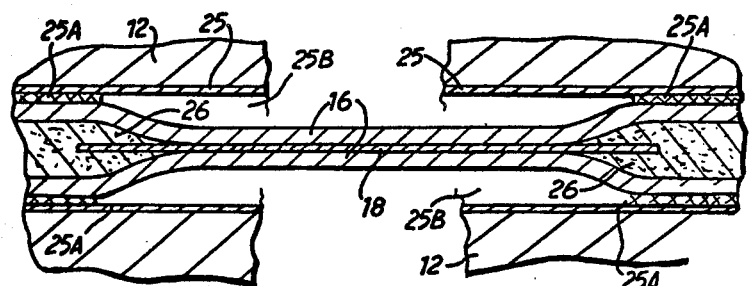
FIG. 6 is a similar view during failure.

Referring now to FIGS. 5 and 6 there is shown a reinforcing element in a composite material, the element consisting of a relatively weak sheath 25 bonded at its opposite end regions 25A to a load bearing inner tubular element 16 capable of plastic deformation under tensile load. The regions 25A may consist of a polymeric adhesive material such as an epoxy resin and between these regions the sheath 25 and the tubular element 16 are spaced apart as indicated at 25B. Located within the element 16 is a core member 18 capable of withstanding the load resulting from inward collapsing of the element 16 under load. The core member 18 is supported in a foamed plastics or low elastic modulus plastics material 26 which maintains the core member in a central position and also prevents the matrix material 12, in which the entire element is embedded, from penetrating the region around the core member during fabrication of the composite material. Alternatively the inner rod 18 can be bonded to the element 16 at the ends only, in a similar fashion to the joint 25A to prevent ingress of molten matrix material during fabrication of the material.

The element described is one of a large number of short reinforcing elements randomly embedded in the matrix 12 to form a composite material. The individual elements could be assembled from suitable lengths of appropriate tube or wire material cut from continuous tubes and wires, and articles could be formed from the composite material by injection moulding or other convenient technique. In many instances a polymeric matrix material will be utilised, but concrete or other materials could be used as a matrix.

Since the sheath 25 is bonded to the matrix 12 over its entire length, under tensile load the maximum tensile stress generated in the sheath will occur at its centre point. Thus under overload conditions the sheath will fracture at its centre point and stress will then be transferred from the matrix through the bonded end regions 25A to the tubular element 16. Deliberately induced weak points could be used to control the initial point of failure of the element if desired. Increasing stress will cause the element 16 to deform plastically by collapsing on to the core member 18 as shown in FIG. 6. By provision of a deliberately induced weak point midway of the length of the element 16 it can be caused to collapse initially in this central region, and thereafter continued increase in load will cause progressive collapsing in one or both directions outwardly from the centre. It will be noted that the nature of the filling material 26 is such that it presents little or no resistance to the collapsing mechanism.

A stage may eventually be reached at which the tubular element 16 has collapsed throughout its length except at the end regions where it is bonded to the sheath 25. If extension of the composite material continues to increase beyond this point the bonds 25A are arranged to fail in shear at the interface with the sheath 25 and the element 16 will pull out of the sheath and matrix at a generally constant high stress level against residual friction forces.

Thus the embodiment provides a composite reinforcement element which absorbs energy under tensile stress by a self-deformation process, and which may be readily fabricated from relatively simple parts. A plurality of such short elements may be randomly dispersed in a matrix to form a high-energy absorbing composite material having desirable failure characteristics. A number of modifications may be made to this form of the invention. For example, where a central core member is provided this need not be supported in a surrounding material such as is indicated at 26 in the drawing. When used as reinforcing elements in composite materials the sheath may be relatively strongly bonded to the surrounding matrix to enhance the transverse load-carrying properties of the material.

Figure 7:
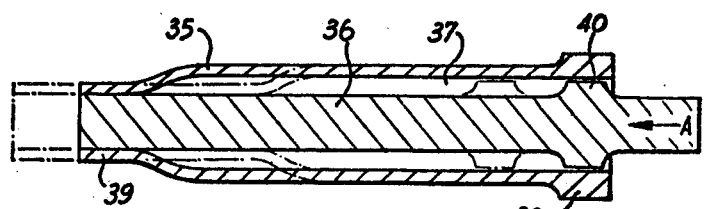
FIG. 7 is a vertical cross-section through an energy-absorbing structure in the form of a support for a motor vehicle bumper.
Figure 8:
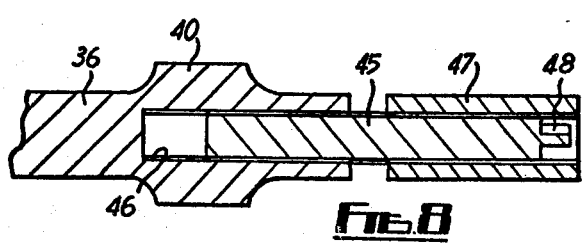
FIG. 8 is a fragmentary cross-section showing a modification of the structure shown in FIG. 7.

FIGS. 7 and 8 show the application of the invention to an energy absorbing structure in the form of a support for a motor vehicle bumper. The structure comprises an outer tubular element 35 and an inner member 36 with an annular space 37 between them. The element 35 is made from a material which exhibits plastic deformation under tensile load; it is anchored at its forward or outer end 38 to the structure of the vehicle and has a reduced diameter rear or inner end 39 welded or otherwise secured to the inner member 36. Both the tubular element and the inner member may be made of steel. The inner member includes an enlarged diameter region 40 which is engaged in the forward end of the element 35 and serves to centralize the member 36 in the tubular element. The forward end of the member 36 projects beyond the element 35 and acts as a support for the vehicle bumper (not shown). Generally two such supports would be provided at each end of the vehicle to support the front and rear bumpers.

In use, application of a shock load to the member 36, due, for example, to collision with another vehicle, moves the member 36 inwards, that is in the direction of arrow A. The load is thus transmitted to the tubular element 35 from the inner end of the member 36, and as the element is anchored to the vehicle at its outer end 38, the tubular element is placed under tension. The tensile load causes the element to deform by progressively collapsing on to the member 36 such that the structure elongates as indicated in broken lines. This deformation takes place at a constant high stress and absorbs the energy of the impact. The tubular element will not fracture under tension since it collapses on to the inner member at a stress below the ultimate tensile strength of the element, and additional impact energy then goes to collapsing the next region of the element, further deformation of the already collapsed section being prevented by the inner member.

FIG. 8 shows a modification in which the bumper bar is supported on the inner member by a differential screw 45 engaged in a socket 46 in the member 36 and in a collar 47 to which the bumper may be attached. The forward end of the screw 45 is recessed from the front of the bumper and fitted with a square or other head 48 enabling the screw to be rotated using a wheel brace or other tool. In this way the bumper could be restored to its initial position after an impact. This could be done several times, depending on the severity of impact, before the structure required replacement.

A construction similar to that shown in FIG. 7 or 8 could be used to provide a collapsable vehicle steering column, and reinforcing elements for composite materials could be similarly constructed to improve compressive strength. Such elements when embedded in a matrix would debond progressively therefrom as the tubular element contracted inwardly and thereby provide a variable shear strength interfacial bond with the surrounding matrix under a compressive loading. Moreover the tubular element could be arranged to contract towards, but not on to, the central member.

In all the embodiments so far described a tubular element has performed an energy absorbing function by collapsing on to a core member located within it. Similar energy-absorbing structures can also be produced without the need for such a core or support member. As an example of such a construction an epoxy resin matrix was reinforced by a plurality of reinforcing elements each consisting of a high strength steel tube having an outside diameter of 2.68 mm. and an inside diameter of 2.05 mm. The tubes were embedded in the matrix during construction, and under tensile load it was found that the reinforcing elements deformed plastically to bring about ductile debonding extending progressively from the region of cracks occurring in the matrix. The term "ductile debonding" used herein refers to failure of the interfacial bond between an inner tubular element and an outer member accompanied by measurable permanent reduction in cross-section of the inner tubular element. The debonding proceeded to a point at which the area of bond between the matrix and the reinforcing elements was reduced to an extent that the interfacial bond was disrupted and the elements started to pull out of the matrix against residual frictional forces. It was not possible to bring about tensile failure of the reinforcing elements, and hence failure of the material consisted of debonding followed by pulling out of the reinforcing elements with considerable energy absorption before fracture.

Similar results were achieved with tubes having an outside diameter of 1.47 mm. and an inside diameter of 1.06 mm. In comparative tests with conventional reinforcing elements of solid wire or fibre form, necking-down in the region of matrix cracks proceeded to the point at which the fibres failed in tension causing crack propagation through the matrix and fracture of the material with a lower work of fracture.

The effectiveness of reinforcing elements in accordance with this embodiment of the invention depends on the ultimate tensile strength of the tubular elements being greater than the stress developed at the point where debonding occurs. Experiments have been carried out using tubular elements of high strength steel, but it is envisaged that similar results could be obtained using other materials showing plastic deformation under tensile stress, such as metals and certain polymers.

Tubular elements constructed in this way do not require the presence of a central wire, fibre or other support member as described in the previous embodiments since they will debond progressively from the surrounding matrix and elongate in a uniform manner before failing in tension. Achievement of the desired result is governed by the wall thickness of the element, that is by the ratio of the cross-sectional area of the bore of the element to the total cross-sectional area of the element, and by the properties of the material from which the element is constructed.

Various modifications may be made to this aspect of the invention. For example each reinforcing element could be located within a tubular sheath relatively strongly bonded to the surrounding matrix and relatively weakly bonded to the reinforcing element. In this way improved resistance to both transverse and longitudinal tensile stresses is achieved. Provision of a sheath also enables a matrix of an elastic material, such as a rubbery material or a ductile metal, to be used. The reinforcing elements may also be provided with induced weak points at predetermined locations along their lengths.

The various embodiments of the invention shown in the drawings may be modified by replacing the tubular element and the core onto which it collapses by a modified tubular element which operates in the manner of the embodiment just described. Alternatively, where the tubular element has an appropriate wall thickness it may be arranged to collapse towards but not on to the inner member. Generally, however, it is envisaged that the tubular element will collapse on to the inner member which thereby limits the extent of collapse and prevents failure of the element in tension. In all cases the progressive collapsing of the tubular element performs an energy absorbing function.

Composite materials constructed in accordance with the invention using polymer matrices and reinforcing elements of metal, carbon, boron or other high strength filamentary materials are thought to be suitable for use, for example, in the manufacture of aerofoil blades, containment devices for rotating machinery such as gas turbine engines, and pressure vessels. In less sophisticated spheres it is envisaged that the invention may be applied to the reinforcement of concrete structures used in building and examples have been shown of the application of the invention to energy absorbing structures used in the construction of motor vehicles.

We claim:

1. A composite article resistive to tensile stress, said article comprising at least two components and incorporating, as one component, a load-bearing tubular element of ductile material bonded to a second component having its longitudinal axis substantially parallel to the expected direction of tensile stress in the article, the ductility of the tubular element being such that the element deforms plastically at a part intermediate its ends when subjected to axial tensile stress less that the ultimate tensile strength of the element, said ductile material of the tubular element having deformation characteristics such that the wall of that portion of the tubular element contracts towards its longitudinal axis thereby absorbing energy.

2. A composite article comprising at least three components and incorporating (1) a ductile, load-bearing tubular element bonded to a second component, the ductility of the tubular element being such that the tubular element deforms plastically at a part intermediate its ends when subjected to an axial tensile stress which is lower than the ultimate tensile strength of the element, the tubular element having deformation characteristics which cause its wall to contract toward the longitudinal axis thereof, (2) an inner member positioned at least partially within at least part of the tubular element which is engaged by the tubular element as it contracts and resists contraction to cause absorption of energy.

3. A composite article as claimed in claim 2, in which said inner member is rigidly connected to said tubular element at two points spaced apart from each other and elongates before said tubular element elongates in response to said axial tensile stress.

4. A composite article as claimed in claim 2, in which said inner member is rigidly connected to said tubular element at two points spaced apart from each other and breaks before said tubular element breaks in response to said axial tensile stress.

5. A composite article as claimed in claim 3, in which said inner member has local zones of weakness at which it extends in response to said axial tensile stress, 6. A composite article resistive to tensile stress, said article comprising at least two components and incorporating, as one component, a ductile, load-bearing tubular element reinforcement means having its external wall inter facially bonded to the other of said components and its axis substantially parallel to the expected direction of tensile stress in said article, the tubular element being such that the tubular element deforms plastically at a location intermediate its ends when subjected to axis tensile stress which is less than the ultimate tensile strength of the material of the element, the deformation characteristics of said tubular element being such that when subjected to tensile stress it debonds from the other component as the tubular element contracts towards its longitudinal axis whereby a proportion of the tensile stress to which the article is subject is transferred from one part to other parts of the article by the element as it debonds.

7. A composite article as claimed in claim 6, in which an inner member is arranged at least partially within part of said tubular element and is engaged by said contracting part of the tubular element when the composite article is subjected to stress and to resist said contraction, thereby causing absorption of energy.

8. A composite article as claimed in claim 7, having the inner member formed to elongate or break before said tubular element in response to said axial tensile stress.

9. A composite article as claimed in claim 8, having the inner member formed with local zones of weakness at which it extends in response to said axial tensile stress.

10. A composite article as claimed in claim 1, having interposed between said tubular element, and bonded directly thereto, a sheath member which is also bonded to said other component, the ultimate tensile strength of said sheath member being less than that of the tubular element.

11. A composite article as claimed in claim 10, in which the relative bond strength between said sheath member and said other component is greater than the bond strength between said tubular element and said sheath member.

12. A composite article as claimed in claim 11, in which said sheath member is provided with local zones of weakness at which it breaks under said tensile stress prior to any rupture of said tubular element.

13. A composite article resistive to tensile stress comprising a matrix incorporating as reinforcement means therein at least one load-bearing tubular element of ductile material having its longitudinal axis substantially parallel to the expected direction of tensile stress in the article, said tubular element being contained at least partially in and bonded to the matrix material of the matrix, the ductility of the tubular element being such that the element deforms plastically at a part intermediate its ends when subjected to an axial tensile stress less than the ultimate tensile strength of the tubular element, said ductile material of the tubular element having deformation characteristics such that under tensile stress conditions the wall of said intermediate part of the tubular element contracts towards its longitudinal axis and debonds from the matrix material, the deformation of the tubular element resulting in transfer of tensile stresses to other parts of said matrix while at the same time absorbing energy.

14. An energy absorbing composite structure resistive to tensile stress including, as the primary tensile load-bearing element, a ductile high strength steel tubular element embedded in and interfacially bonded to a rubbery plastic matrix, the tubular element having its longitudinal axis substantially parallel to the expected direction of tensile stress in the composite structure and, when subjected to tensile stress, the element debonds progressively from the surrounding matrix while contracting towards its longitudinal axis, thus its resistance to debonding and contraction causing absorption of energy up to the ultimate tensile strength of the composite structure.

15. An energy absorbing composite structure resistive to tensile stress comprising:
  1. an inner core member of high strength steel;
  2. a load-bearing tubular element of ductile, high strength steel bonded to and, at least partially surrounding the inner rod (1); and
  3. a resin matrix in which the tubular element is embedded; elements (1) and (2) both having their longitudinal axes substantially parallel to the expected direction of tensile stress in the composite structure, the tubular element when subjected to tensile stress being adapted to deform at a part intermediate its ends and contract toward the longitudinal axis thereof and engage the inner core member thus resisting contraction to cause absorption of energy up to the ultimate tensile strength of the composite structure.

* * * * *